L. E. WHITON.
CHUCK.
APPLICATION FILED SEPT. 28, 1907.
966,629.
Patented Aug. 9, 1910.
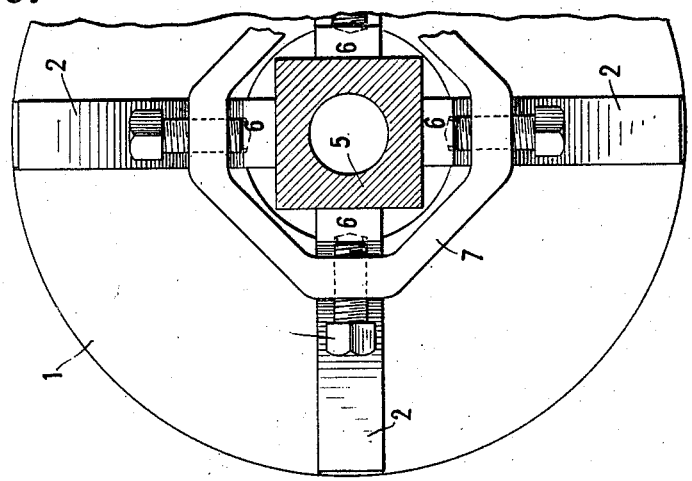
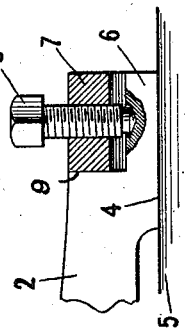
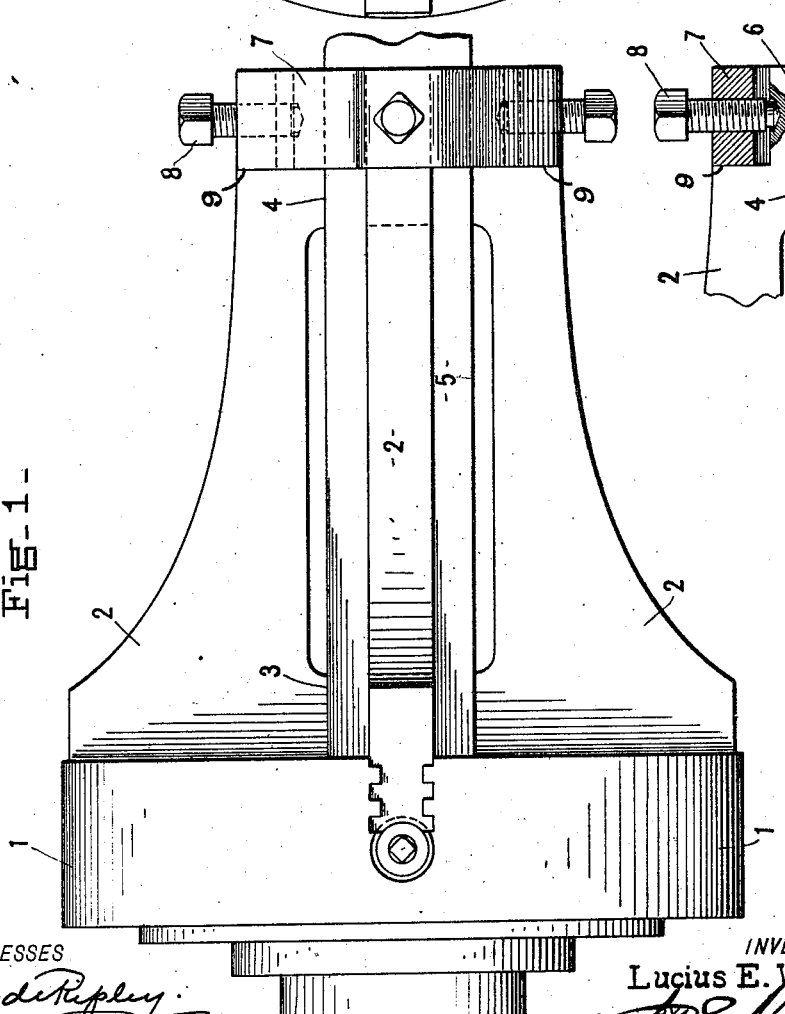
WITNESSES
INVENTOR
Lucius E. Whiton.
ATTORNEY

UNITED STATES PATENT OFFICE.

LUCIUS E. WHITON, OF NEW LONDON, CONNECTICUT.

CHUCK.

966,629.  Specification of Letters Patent.  Patented Aug. 9, 1910.

Application filed September 28, 1907. Serial No. 394,958.

*To all whom it may concern:*

Be it known that I, LUCIUS E. WHITON, a citizen of the United States, residing at New London, in the county of New London and State of Connecticut, have invented certain new and useful Improvements in Chucks, of which the following is a specification.

My invention relates to improvements in chucks and particularly for holding work during boring operations.

The main object is to hold work, especially long pieces, securely.

The invention consists in a chuck having special jaws and means for adjustably supplementing their clamping action at their other ends.

Figure 1, is a side view of a chuck of my invention with work in place. Fig. 2, is a fragmentary face view of the same. Fig. 3, is a fragmentary detail of the end of a jaw.

The invention is shown as particularly adapted to an independent jawed chuck having body 1, and jaws 2, 2, 2, adjustable as is customary. Each jaw has two gripping portions 3 and 4, the latter being somewhat remote from the former, so that the work 5 is grasped at two points quite a distance apart. This gives a steady support for the work which prevents chattering.

Preferably the end of each jaw is reduced in size as at 6 and a collar 7 surrounds them all. This collar carries clamp screws 8, 8, which set up against the jaw ends for drawing them snugly against the work. The collar is preferably angular in form so that the portions between the clamp screws constitute substantially straight, inflexible tie rods. The collar abuts against the shoulders 9, 9 of the jaws.

When work is being put in the chuck, the jaws are first set up by the customary method so as to center it properly. The clamp screws 8, 8, are then set up so as to more securely center the outer end of the work and prevent the jaws from bending. The work is thus held by a sort of truss, which consists of the chuck body and the collar and the longitudinal members or jaws. The work is removed by an operation, the reverse of that above described.

What I claim is:

1. In a chuck construction, a body, a plurality of jaws adjustably carried thereby and each having two gripping surfaces longitudinally spaced apart and independent means for adjusting the inner and outer ends of said jaws.

2. A chuck construction, consisting of a body, a plurality of independently adjustable jaws each having two gripping surfaces remote from each other, and means for individually clamping the ends of the jaws against the work.

3. A chuck comprising a body, a plurality of adjustable jaws, a collar and independent clamping screws carried by said collar and coacting with the different jaws.

4. A chuck comprising a body and jaws adjustable therein, each having a gripping surface near the body and an extension with a gripping surface remote from the body, and a collar surrounding the ends of the extensions and clamping the same.

5. A chuck comprising a body and a plurality of rigid jaws adjustable therein, each jaw being integral and having a gripping surface adjacent the chuck body and a second gripping surface remote from the first and in substantial longitudinal alinement therewith and means for clamping the outer ends of the jaws.

6. A chuck comprising a body, a plurality of radially adjustable jaws carried thereby an angular collar surrounding said jaws and clamping screws projecting into the interior angles of said collar and co-acting with the several jaws.

7. A chuck comprising a body, a plurality of adjustable jaws carried thereby and each having its end cut away to form a seat and a shoulder, a collar surrounding the seats of said jaws and abutting against said shoulders and clamp screws carried by said collar and co-acting with the seats of said jaws for the purpose specified.

In testimony whereof I affix my signature in presence of two witnesses.

LUCIUS E. WHITON.

Witnesses:
L. G. STEBBINS,
J. H. GUMBLE.